United States Patent Office 2,919,093
Patented Dec. 29, 1959

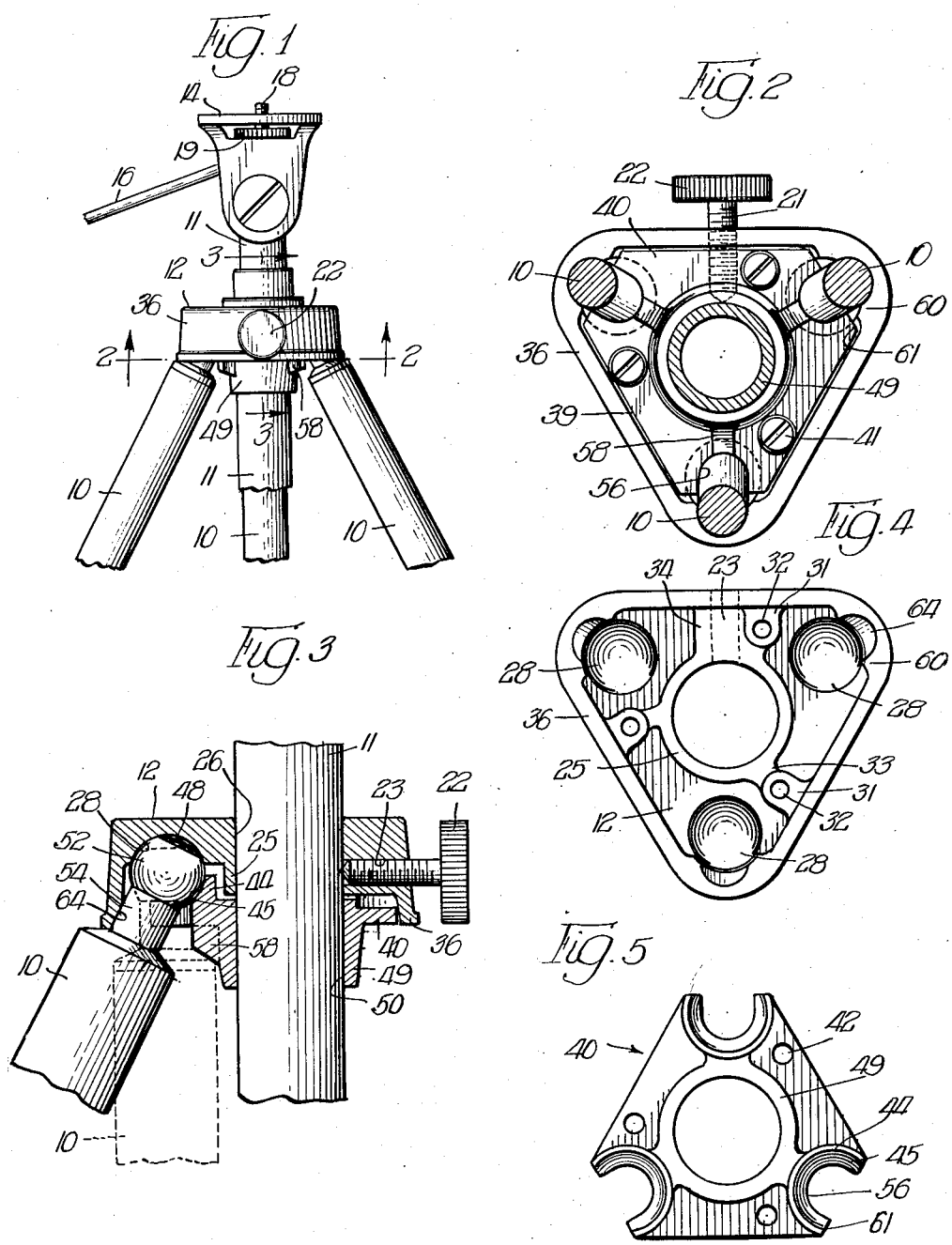

2,919,093

TRIPOD

Raymond Mooney, Skokie, Ill., assignor to Quick-Set, Incorporated, Skokie, Ill., a corporation of Illinois Application February 28, 1955, Serial No. 490,803

2 Claims. (Cl. 248—168)

This invention relates to an instrument supporting stand for cameras and the like instruments, and more particularly to folding tripods.

In tripods, it is important that the device be stable and firmly held when the legs are in spread position, so that the camera and the like instrument is not moved in operation. Another requirement is that the tripod be foldable, so that it can be conveniently carried and stored. To meet these requirements, in the past, the legs have been pivoted on a pin on the base member. Although ball and socket joints were known, they were considered unsuited for tripods because of the steady support necessary.

It is, therefore, an object of this invention to provide a folding tripod for cameras and the like, having a ball and socket joint between the legs and supporting base, which is stable and rigid when the legs are spread for use.

It is a further object of the invention to provide a tripod having ball and socket joints in which the legs are restricted for movement in a single plane.

It is a still further object of the invention to provide a tripod which is simple in construction and cheaply and easily manufactured.

Further objects and advantages of this invention will become evident as the description proceeds and from an examination of the accompanying drawing which illustrates one embodiment of the invention and in which similar numerals refer to similar parts throughout the several views.

In the drawings:

Figure 1 is a fragmentary side elevation of the tripod embodying the invention.

Figure 2 is an enlarged sectional view taken substantially along line 2—2 of Figure 1.

Figure 3 is an enlarged vertical sectional view of the supporting base and associated parts, taken substantially in the plane of line 3—3 of Figure 1.

Figure 4 is an enlarged bottom view of the supporting base with the plate 40 removed.

Figure 5 is an enlarged plan view of the plate 40 removed from the supporting base.

Referring now to Figure 1, which illustrates a tripod for use with a camera or like instrument, the extensible legs 10 are spread to form a vertical support for the supporting base 12. The legs are each secured by a ball and socket joint to said supporting base.

A shaft 11 is supported by base 12 for longitudinal, vertical adjustment. Shaft 11 in turn supports a platform 14 which is pivotally and rotatably secured to the upper end of shaft 11 in a manner disclosed in applicant's Patent No. 2,143,606, issued January 10, 1939. This type of swivel mounting in the platform enables it to be moved in any desirable position by operation of the control arm 16 which extends outwardly therefrom. The instrument to be supported is secured to the platform by the set screw 18 which projects through the platform and may be operated by rotating the milled wheel 19. The shaft 11 is adjusted manually to the desired height and then locked in such desired position by a set screw 21 and milled wheel 22, on the base 12.

As shown in Figure 3, a boss 25 depends from the base member 12 and an opening is provided in the base member 12 forming an upper bearing member 26 for supporting the shaft 11, and a threaded hole 23 in base 12 radiates from said opening for a set screw 21.

Referring now to Figures 3 and 4, the supporting base is a die-cast in the general configuration of an equilateral triangle with rounded corners. On the bottom of the base member, at each corner thereof, are concave depressions 28 which form a portion of a socket of the ball and socket joint, for attaching the legs 10 to the base 12. Bosses 31 are formed on the undersurface of base 12, having threaded holes 32. The bosses are formed on the under surface of base 12. Skirt 36 is tied to boss 25 by webs 33. An enlarged web 34 is provided at one side between the boss 25 and the edge of the base for threaded hole 23.

A skirt 36 depends from the periphery of the base member. The skirt contains between its sides a plate 40 on the under side of the base. The plate is slightly smaller in size than the inner dimensions of said skirt. As best shown in Figure 2, there is a small gap 39 between the outer edges of the plate and the inner sides of the skirt, whereby the plate is self-adjusting, as more particularly described hereinafter.

The plate member 40 is secured by screws 41 which fasten in threaded holes 32 to the under side of base 12. As shown in Figures 3 and 5, the plate 40 has semi-cylindrical projections 44 having depressions in the shape of spherical sections 45 at the upper inner portions of each projection which, together with the depressions 28 in the base, form sockets 48 for the swivel mounting of the legs of the tripod to the supporting base. Depending from the bottom surface of the plate 40 is a boss 49 having an opening that forms a lower bearing 50 for supporting shaft 11. Legs 10 have generally ball-shaped members 52 received in sockets 48, defined between depressions 28 in the supporting base, and depressions 45 on the plate 40.

The legs 10 are connected to the ball members 52 through necks 54 of a smaller diameter than said ball members. Elongated guide openings 56, each having a rounded end, straight sides, and an open end, are provided at the corners of the plate member for restricting the movement of each of the necks 54 to a single vertical plane passing through the center and a corner of the base, so that the leg members are confined in their movement to such single plane when they swing between closed and spread positions. Stops 58 are mounted on the boss 49 on the inner portion of the plate for abutting the neck when the legs swing to folded position.

Pads 60 are formed in each of the inner corners of the skirt 36. The corners of plate 40 are cut away as at 61 in lines spaced from said pads.

Plate 40 is a self-adjusting element which contacts and rests against balls 52 of the ball and socket joint through projections 44 and depressions 45. There is no contact between the plate 40 and base 12, since said plate is spaced from bosses 31 and the size of said plate is smaller than the inner dimensions of skirt 36 and pads 60. Screws 41 hold said plate and projections 44 against balls 52 under adjustable tension to insure a sufficiently tight ball and socket joint so as to provide adjustable frictional contact between the balls and socket, whereby the legs are given adjustable frictional resistance in their swinging movement.

In each bottom, inner corner of the skirt 36, facing the necks 54 of the leg members, are formed recesses, preferably of arcuate configuration, 64 in pads 60, for receiving and holding each neck against lateral movement when the legs swing to spread position. The recesses 64 have a slightly smaller radius of curvature than the necks 54, so that such necks are tightly and firmly held by a wedging action against lateral movement and the tripod is given a firm, steady support in use.

From the foregoing the operation of the tripod should be apparent. In use the operator will release the control member 16 from its depressed position and will rotate the milled wheel 22 in the proper direction to release the set screw 21 and provide free movement of shaft 11. The shaft will then be adjusted until it has reached a position in the mid-point of its possible travel, and it may then be locked in this position by the tightening of milled wheel 22.

The legs 10 may be then unfolded by swinging them outwardly so that the necks 54 are tightly wedged in recesses 64 formed in the skirt 36 of the supporting base 12. In this way the tripod is given a firm and steady support, although a ball and socket joint is employed in the connection between the legs and the base. After the operation is completed, the tripod is folded into compact position by swinging the legs 10 inwardly. The legs are prevented from universal movement and are confined to the swinging in a single plane by guide openings 56 of a slightly larger opening than the necks 54, although a ball and socket joint is employed in mounting the legs to the supporting base. In folded position the necks 54 abut stops 58 to prevent further inward movement.

In the drawing and specification, there have been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention, as further defined in the following claims.

I claim:

1. In a folding tripod for cameras and the like, a base member of a generally triangular shape, a plate member secured to said base member, sockets formed between said base member and said plate member, leg members for supporting said base member having generally ball-shaped members received in said sockets, said leg members each having a neck of a smaller diameter than said ball-shaped members projecting through said plate member, guide openings in said plate member of larger size than said necks for guiding said leg members for movement in a single plane as said leg members swing between closed and spread position, skirt member depending from said base member, and arcuate recesses located at each bottom corner of said skirt member for partially receiving said necks, said arcuate recesses having a radius of curvature less than said necks whereby said legs when in their outermost position said necks are wedged in said recesses, thereby preventing lateral movement of said legs when in their outermost position.

2. In a folding tripod for cameras and the like, a base member, a plate member removably secured to said base member, sockets formed between said base member and said plate member, leg members for supporting said base member having generally ball-shaped members received in said sockets, guide members in said plate member for guiding said leg members for movement in a single plane as said leg members swing between closed and spread positions, a skirt member depending from said base member, and arcuate recesses on said skirt member for receiving portions of said leg members, said recesses having a radius of curvature less than said portions of said leg members whereby said portions, when said leg members are in their spread positions, are wedged in said recesses thereby preventing lateral movement of said leg members.

References Cited in the file of this patent

UNITED STATES PATENTS

| 1,837,380 | Tonkinson | Dec. 22, 1931 |
| 2,188,514 | Moore | Jan. 30, 1940 |
| 2,226,827 | Moore | Dec. 31, 1940 |
| 2,229,474 | Redmer | Jan. 21, 1941 |
| 2,627,386 | Akans | Feb. 3, 1953 |

FOREIGN PATENTS

| 130,685 | Sweden | Jan. 30, 1951 |
| 558,892 | Germany | Sept. 14, 1932 |
| 800,515 | France | May 4, 1936 |